(12) United States Patent
Chapman

(10) Patent No.: US 10,063,737 B2
(45) Date of Patent: Aug. 28, 2018

(54) DOCUMENT PRINTING USING HARDWARE-INDEPENDENT PATTERN INK CELLS

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/412,328

(22) Filed: Jan. 23, 2017

(65) Prior Publication Data

US 2018/0213112 A1 Jul. 26, 2018

(51) Int. Cl.
*H04N 1/40* (2006.01)
*H04N 1/32* (2006.01)
*G06K 15/02* (2006.01)

(52) U.S. Cl.
CPC ..... *H04N 1/32197* (2013.01); *G06K 15/1813* (2013.01); *G06K 15/1836* (2013.01); *H04N 1/32219* (2013.01); *H04N 1/32251* (2013.01); *H04N 1/32352* (2013.01)

(58) Field of Classification Search
None
See application file for complete search history.

(56) References Cited

U.S. PATENT DOCUMENTS

| | | |
|---|---|---|
| 8,355,167 B2 | 1/2013 | Chapman et al. |
| 8,797,602 B2 | 8/2014 | Chapman et al. |
| 9,106,847 B2 | 8/2015 | Miller et al. |
| 9,282,215 B2 | 3/2016 | Chapman et al. |
| 9,471,846 B2 | 10/2016 | Fan et al. |
| 2015/0271364 A1 | 9/2015 | Chapman et al. |
| 2016/0096393 A1 | 4/2016 | Chapman et al. |
| 2016/0127603 A1 | 5/2016 | Chapman et al. |
| 2016/0344891 A1 | 11/2016 | Eschbach et al. |
| 2016/0352961 A1 | 12/2016 | Eschbach et al. |

*Primary Examiner* — Thomas D Lee
(74) *Attorney, Agent, or Firm* — Fox Rothschild LLP

(57) ABSTRACT

A system prints a document using a device-independent pattern ink cell that is appropriate for the print device. The system does this by identifying an object in a print job corresponding to a security element that identifies a pattern ink cell for a color parameter. The system then defines a device-independent pattern ink cell for rendering the identified object. The definition of the device-independent pattern ink cell includes at least one scaling routine for adjusting a parameter of the device-independent pattern ink cell based on a resolution of a print device that will be used for printing the document. The system then queries and receives from a print system a device resolution of the print device, executes the at least one scaling routine to transform the device-independent pattern ink cell to yield a device-dependent pattern ink cell, and generates a print using the device-dependent pattern ink cell.

20 Claims, 6 Drawing Sheets

FIG. 1
PRIOR ART

DOCUMENT PRINTING USING HARDWARE-INDEPENDENT PATTERN INK CELLS

BACKGROUND

Security is an important concern in the realm of documents and digital production and/or reproduction of the same to prevent effective printing/copying of certain documents such as high-value printed items including tickets, financial instruments, security passes, pharmaceutical prescriptions, and the like. In security applications, it is desirable to add information to a document that prevents or hinders alterations and counterfeiting. These security elements may conflict with the overall aesthetics of the document.

Watermarking is a common way to ensure security in digital documents. Many watermarking approaches exist with different trade-offs in cost, fragility, robustness, etc. One prior art approach is to use special ink rendering where the inks are invisible under standard illumination. These inks normally respond to light outside the visible range and thereby may be made visible. Examples of such extra-spectral techniques are UV (ultra-violet) and IR (infrared). Another approach taken to provide secure digital documents is digital watermarking (such as correlation marks). However, these special inks and materials are often difficult to incorporate into standard electro-photographic or other non-impact printing systems like solid ink printers, either due to cost, availability or physical/chemical properties.

Use of specialty imaging elements (e.g., GlossMark™ text, microtext lines, etc.) in watermarking to provide fraud protection and anti-counterfeiting measures allows for the use of standard paper inks and toners. While earlier specialty imaging text techniques took up space (or real estate) in the document, and also lack aesthetic value, recent methods allow for casting specialty imaging elements through a dynamic pattern generation process such that the specialty imaging elements can be used with broader design freedom with less restrictions on the use of variable data (e.g., security properties). This may be accomplished by creating a pattern color space (also referred to as "pattern ink cell") that incorporates specialty imaging features using standard page description language (PDL) constructs, such as PostScript constructs. The pattern color space can be selected as a color for a color parameter for an object (e.g., lines, text, geometric shapes, freeform shapes, etc.) or an object characteristic (e.g., line color, fill color, foreground color, background color, etc.). In other words, within a PDL, one can implement specialty imaging text and specialty imaging pattern ink cells. Rather than defining the specific string to be rendered at a specified location on the page, a specialty imaging string may be used to define a dynamically created pattern ink cell. This pattern ink cell is subsequently accessible by other PDL drawing and rendering commands through selection as a color parameter in the command. This type of pattern ink cell is a dynamic variable pattern ink cell that adjusts its size depending on the text string used to define the pattern ink cell. UV and/or IR encoding may also be included in the specialty imaging using a pair of fixed size pattern ink cells that appear to be the same (one lets the UV or IR light pass through and other blocks it) to create the specialty imaging effect.

However, the pattern ink cells used in the above described specialty imaging require exact pixel size and placement to prevent degradation and for accurate printing. This is because while most non-specialty imaging fonts are designed to be scalable and work at a wide range of sizes so that characters that use the font can be placed anywhere on a page in any combination and/or size, specialized fonts used in pattern ink cell such as microtext, Xerox GlossMark™ fonts and Correlation Mark fonts are designed to work at exactly one size based on pixel width and height. Similarly, for a pair of pattern ink cells that may be used to create a UV and/or IR based specialty imaging effect, the size of each of the pattern ink cells is fixed irrespective of the device resolution. Hence, pattern ink cells created for one resolution (e.g., 600×600 dpi) will not work if the resolution if printed using a different resolution (e.g., 1200×1200 dots per inch (dpi)). In addition, many specialized fonts and/or images must be placed in an exact pixel position on a page and be rotated only 0, 90, 180 or 270 degrees if the resolution is square (e.g., 600×600 dpi), or only 0 or 180 degrees if the resolution is not square (e.g., 600×390 dpi). If one particular font works at a height of 240 pixels (which equals 28.8 points on a 600×600 dpi device). Hence, the specialty imaging effect fails or is distorted upon application of even the slightest bit of scaling or displacement (such as change in position or rotation), and in order to achieve a different size an entire pattern ink cell must be provided.

An example of this is shown in FIG. 1, in which a portion of a document 101 is printed by a print device with a speed setting of 325 and a resolution is 600×600 dpi. In this example, the microtext as printed is under one point in size (where one point=1/72 inch), although it has been zoomed in FIG. 1 for purpose of illustration. Document portion 102 has been printed after the print device's speed setting was changed to 500, and the resolution was changed to 390×600 dpi. The same microtext font was used in document 101 and document 102, but the change to the print device's speed and resolution caused the font to no longer correctly work in document 102. Some of the glyphs in document 102 (such as the numbers "4" and "1" are still discernible, but others (such as "6", "0" and "9" have been altered so that they are no longer recognizable.

However, different print devices support different or multiple hardware resolution and, therefore, for pattern ink cell based specialty imaging effects, a new pattern ink cell must be created for each hardware resolution. In other words, a device-specific pattern ink cell must be created for and/or assigned to the device. This adds complexity in creating and tracking different pattern ink cells for different devices having multiple resolutions. While certain methods exist to adjust the font size of a specialty imaging text, they work at the cost of losing the "what you see is what you get" or WYSIWIG, i.e., the document is displayed during document creation in the same way it is expected to be finally displayed or printed.

This document describes devices and methods that are intended to address issues discussed above and/or other issues.

SUMMARY

In an embodiment, a document printing system may include a processor and a non-transitory, computer-readable memory containing programming instructions for defining a device-independent pattern ink cell for use in conjunction with printing a document that includes one or more security elements printable on differing print devices having differing resolutions. The processor may define a bounding shape for a device-independent pattern ink cell in a page description language. The definition of the bounding shape may include a first scaling routine for adjusting a parameter of the bounding shape based on a resolution of a print device that will be used for printing the document. The processor may also define a procedure for painting a variable portion and a fixed portion of the device-independent pattern ink cell within the bounding shape in the page description language. The definition of the procedure may include a second scaling routine for adjusting a parameter of the procedure based on the resolution of the print device that will be used for printing the document.

Optionally, the system may also define the variable portion of the device-independent pattern ink cell in the page description language, define a fixed portion of the device-independent pattern ink cell in the page description language, and store the device-independent pattern ink cell in a memory. In an embodiment, the variable portion of the device-independent pattern ink cell defines at least one of a variable gloss image, a variable microtext string, a variable fluorescent image, a variable infrared image, and a variable correlation image. In at least one embodiment, the variable portion may include variable data identified based on instructions from a user, one or more characteristics of an object that identifies the device-independent pattern ink for a color or ink parameter, and/or one or more characteristics of the document.

Optionally, the first scaling routine may include instructions for identifying the resolution of the print device that will be used for printing the document, and adjusting the parameter of the bounding shape based on the identified resolution.

In at least one embodiment, the second scaling routine may include instructions for identifying the resolution of the print device that will be used for printing the document, and adjusting the parameter of the paint procedure based on the identified resolution.

In at least one embodiment, defining the bounding shape for the device-independent pattern ink may include defining the parameter of the bounding shape in association with a reference print device resolution. In this embodiment, the parameter of the bounding shape may include an XStep value, a YStep value, an xstart value, a ystart value, an xend value, and/or a yend value.

In an embodiment, the parameter of the procedure comprises variable start position coordinates for generating the device-independent pattern ink cell at an arbitrary position on the document.

In another aspect, a document printing system for printing a document using a device-independent pattern ink cell may include a processing device, and a non-transitory, computer-readable memory. The memory includes programming instructions that are configured to cause the processing device to: receive a print job for printing a document that includes one or more security elements, identify an object corresponding to a security element in the print job that identifies a pattern ink cell for a color parameter, and define a device-independent pattern ink cell for rendering the identified object. The definition of the device-independent pattern ink cell includes at least one scaling routine for adjusting a parameter of the device-independent pattern ink cell based on a resolution of a print device that will be used for printing the document. The memory further includes programming instructions that are configured to cause the processing device to: query a print system to return a device resolution and a current page location for a print device of the print system that will be used for printing the document, receive the device resolution and the current page location from the print system, execute the at least one scaling routine to transform the device-independent pattern ink cell to yield a device-dependent pattern ink cell, generate a print file for the document using the device-dependent pattern ink cell, and transmit the print file to the print device of the print system. The print file will cause the print device of the print system to print the document with the one or more security elements at a scale corresponding to the device resolution and the current page location.

Optionally, the system may also include the print device, and additional programming instructions that are configured to cause the print device to receive the print file, and use the print file to print the document on a substrate.

In an embodiment, generating the print file for the document using the device-dependent pattern ink cell may include generating a raster image print file for the identified object using the device-dependent pattern ink cell.

Optionally, querying the print system to return the device resolution and the current page location may include querying a digital front end of the print system to return the current page location, and querying a print engine of the print system to return the device resolution.

In an embodiment, the identified object includes one or more of the following: a straight line segment that identifies a pattern ink cell for line color, a freeform line segment that identifies the pattern ink cell for line color, a geometrical shape that identifies the pattern ink cell for fill color, or a freeform geometrical shape that identifies the pattern ink cell for fill color.

In at least one embodiment, defining the device-independent pattern ink cell for rendering the identified object may include defining a bounding shape for the device-independent pattern ink that includes a first scaling routine, and defining a procedure for painting a variable portion and a fixed portion of the device-independent pattern ink cell within the bounding shape that includes a second scaling routine define in a page description language. The first scaling routine may adjust a parameter of the bounding shape based on a resolution of the print device used for printing the document, and the second scaling routine may adjust a parameter of the paint procedure based on the resolution of the print device. In this embodiment, the system may also include additional programming instructions configured to cause the processor to define the variable portion of the device-independent pattern ink in the page description language, and define a fixed portion of the device-independent pattern ink in the page description language.

Optionally, executing the at least one scaling routine to transform the device-independent pattern ink cell to yield the device-dependent pattern ink cell may include adjusting the parameter of the device-independent pattern ink cell based on the device resolution and the current page location.

Optionally, the system may save the defined device-independent pattern ink cell to a memory. In an embodiment, defining the device-independent pattern ink cell for rendering the identified object may include receive a previously stored device-dependent pattern ink cell, and transforming the previously stored device-dependent pattern ink cell to the device independent pattern-ink cell by adding a scaling routine to the definition of the previously stored device-dependent pattern ink cell.

BRIEF DESCRIPTION OF THE DRAWINGS

FIG. 1 illustrates an example problem that can occur in the prior art when applying a specialized font to devices having different settings.

DETAILED DESCRIPTION

Figure 2:
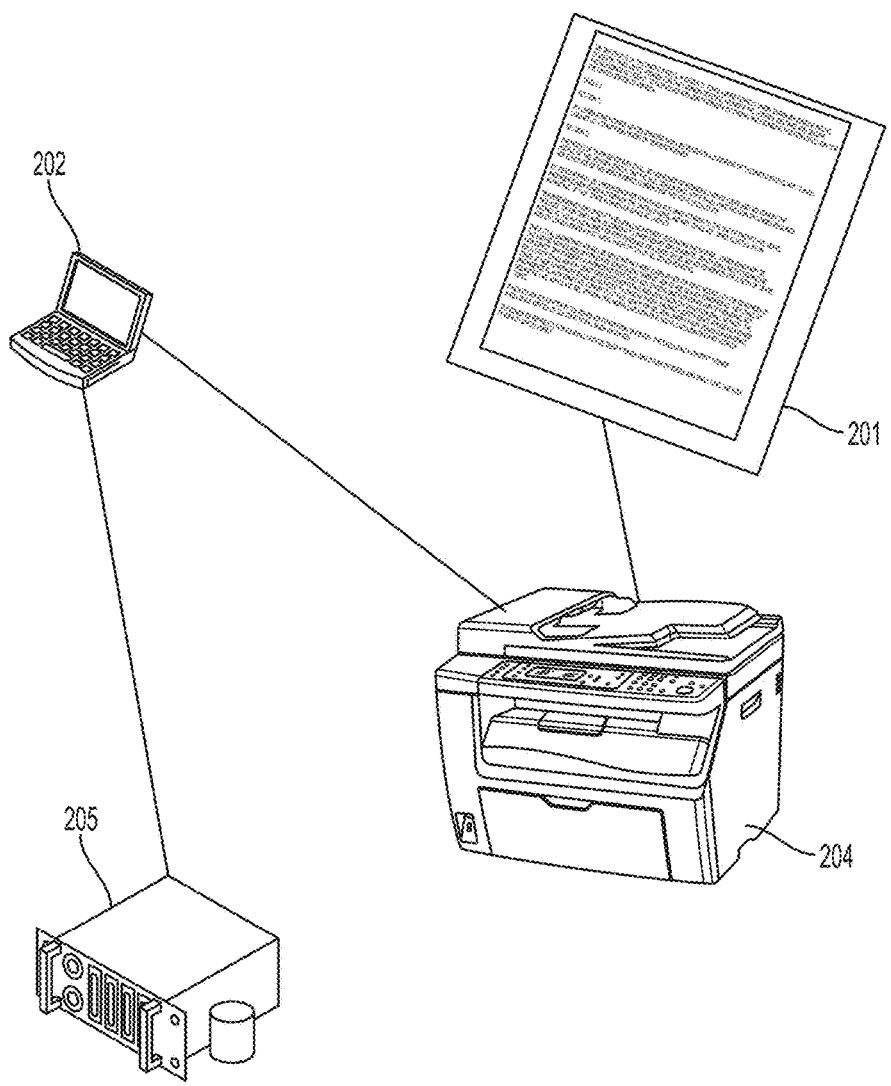
FIG. 2 depicts example components of a system for creating a device-independent pattern ink cells and printing a document using the pattern ink cells.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

The term "document" refers to a print media substrate that may be any two-dimensional material and that includes a set of content. The content may be printed on the print media substrate using toner and/or ink. The document may, for example, include one or more areas comprising characters, and one or more other areas consisting of images.

The term "electronic device" refers to a device having a processor and a non-transitory, computer-readable medium (i.e., memory). The memory may contain programming instructions in the form of a software application that, when executed by the processor, causes the device to perform one or more processing operations according to the programming instructions. An electronic device also may include additional components such as a touch-sensitive display device that serves as a user interface, as well as a camera or other image capturing device. An electronic device also may include one or more communication hardware components such as a transmitter and/or receiver that will enable the device to send and/or receive signals to and/or from other devices, whether via a communications network or via near-field or short-range communication protocols.

The term "pattern ink cell" refers to a pattern color space created from a variable portion that contains a first text string, where it is understood that 'text' in this context refers to any symbol or sequence of symbols that can be found in typefaces or fonts, including alphanumeric characters, icons, symbols and the like. In essence, rather than rendering a text string to a page or paper, the text string is rendered into a memory structure that can be used as a tile for subsequent imaging. In one embodiment, a first text string rendered as GlossMark™ text defines the pattern ink cell. In the conventional specialty imaging techniques, pattern ink cells in page description languages; such as PostScript™, PDL, and PDF (Portable Document Format); are typically used for repeating patterns, essentially, the pattern ink cells correspond to tiles that are regularly laid across the page. In a typical situation, each pattern ink cell is a geometrical area (defined by a bounding box) that is repeated in both x-direction and y-direction across the page. Subsequent PostScript™ or other appropriate commands 'expose' that pattern to the printed page in the desired spots, where the phasing of the pattern ink cell is constant with respect to the original definition. It should be understood to those skilled in the art that while the current disclosure describes systems and methods for creating a device-independent pattern ink cell where the pattern ink cell is a single dynamic variable pattern ink cell (as discussed above), similar principles can be applied for creation of a pair of fixed device-independent pattern ink cells to create UV and/or IR type specialty imaging effects.

A "print device" or "print engine" is a device that is configured to print a document based on digital data, or a multi-functional device in which one of the functions is printing based on digital data. Example components of a print device include a print head, which may include components such as a print cartridge containing ink, toner or another print material, as well as a document feeding system configured to pass a substrate through the print device so that the print head can print characters and/or images on the substrate.

A "print system" is a system of hardware components that include a print device and other components. For example, a printing system may include a marking engine (i.e., the print hardware or print engine) and a digital front end. A digital front end (DFE) is an integrated print workflow management system, including one or more processing devices, capable of receiving and processing print requests and controlling the operation of a print engine to fulfill the print request. The DFE and print engine may be part of a single device (such as a digital printing press), or separate parts of a system of networked devices.

A "processor" or "processing device" is a hardware component of an electronic device that is configured to execute programming instructions. The term "processor" may refer to either a single processor or to multiple processors that together implement various steps of a process. Unless the context specifically states that a single processor is required or that multiple processors are required, the term "processor" includes both the singular and plural embodiments.

This document describes a system by which a processor of an electronic device will define a device-independent pattern ink cell when causing a print device to print a document that includes specialty imaging elements created using the device-independent pattern ink cell. A device-independent pattern ink cell may be created and stored in a memory and accessed by the processor when generating the commands to print the document. In this system, the device-independent pattern ink cell will include one or more scaling routines that will adjust various characteristics of the pattern ink cell during printing, optionally on a per page basis. In this way, a single device-independent pattern ink cell can be applied to multiple print devices, regardless of the resolution, feed orientation, or other characteristics of the print device.

FIG. 2 illustrates an example of a system for generating a printed document 201 that includes specialty imaging elements using an electronic device 202 and print device 204. The electronic device 202 may be a component, or include one or more components, of the print device 204, or they may be separate devices as shown. The electronic device generates a print file that it sends to the print device 204. The electronic device 202 may create a device-independent pattern ink cell and store it to a memory 205, which is optionally part of the electronic device 202 or optionally external to the electronic device (as shown) and accessible by one or more communication networks. The electronic device 202 will use the device-independent pattern ink cell to generate a print file specific to the print device 204 (in real time), and the print device 204 will use instructions and parameters in the print file to determine how to print the document 201.

In some embodiments, a pattern ink cell stored in a memory may be a device-dependent that is specific to a particular print device or type of print device and that is not, by itself without transformation, scalable across a wide variety of print devices. The electronic device 202 may transform the device-dependent pattern ink cell to define a device-independent pattern ink cell, which is then used to generate the device specific print file for the print device 204 for printing the document 201.

Figure 3:
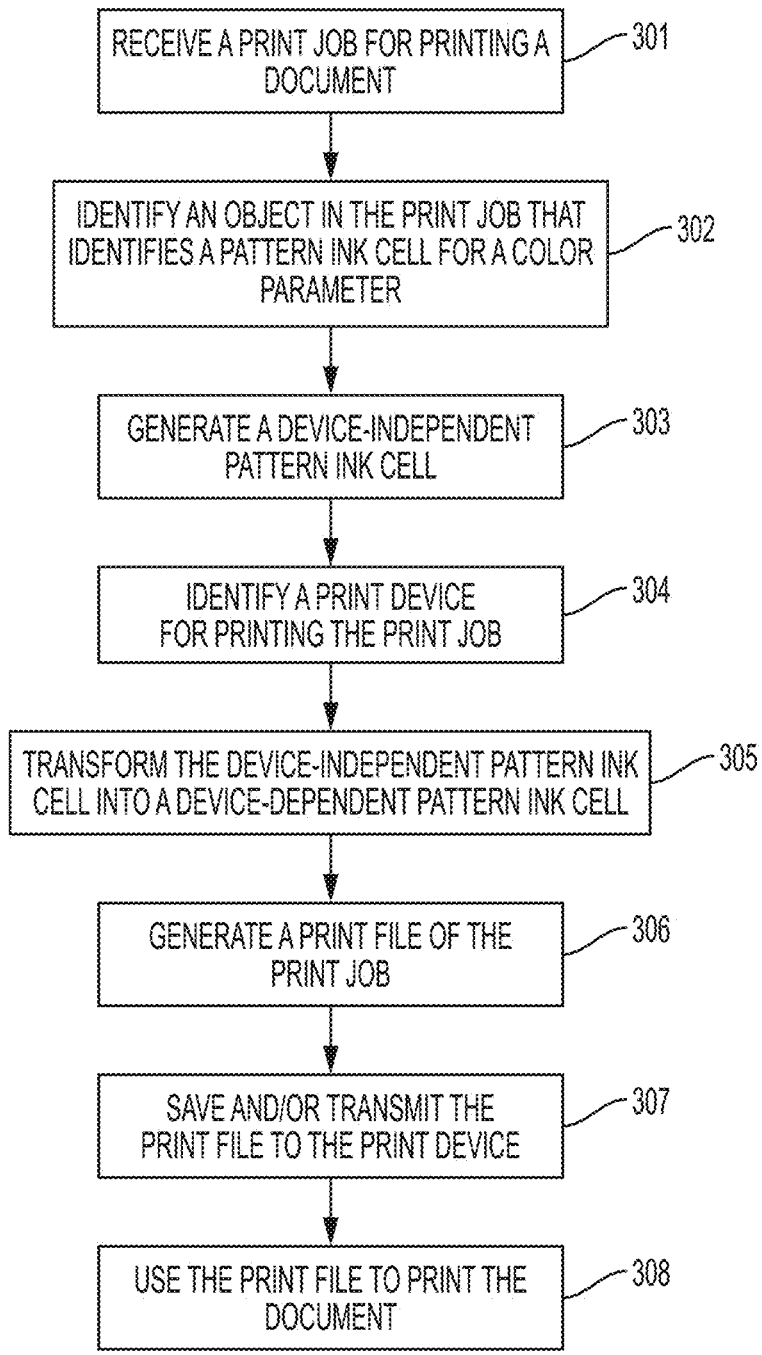
FIG. 3 depicts an example flowchart that illustrates the method of generating a device-independent pattern ink cell and using the device-independent pattern ink cell to print a document that includes specialty imaging elements created using the device-independent pattern ink cell.

FIG. 3 illustrates a process for generating a device-independent pattern ink cell that includes one or more scaling routines, and using the device-independent pattern ink cell to cause a print device to print a document that includes specialty imaging elements.

In an embodiment, the electronic device may receive 301 a print job for generating a printed document, including variable data to be used in conjunction with the print job for printing security elements such as specialty imaging elements. In one embodiment, the print job may be received from an external source, such as by email, file transfer or another communications protocol. Alternatively, the electronic device may receive the print job by generating it based on user input through a document generation application such as a word processor, publisher, web browser or other document generation application.

The system may identify one or more objects in the print job that identify a pattern ink cell (and/or) for a color or ink parameter (step 302). In an embodiment, at least a first object within the print job may identify a pattern ink cell for a color or ink parameter. Examples of the object may include a straight line segment or a freeform line segment that identifies a pattern ink cell for line color, a geometrical shape or a freeform shape that identifies a pattern ink cell for fill color, or the like. The objects may be included in the print job and established based on user selection, application defaults, electronic device defaults, or other instructions. The system may also analyze the print job and extract metadata or other instructions indicating each area in the document at which a particular object and corresponding pattern ink cell will be applied, such as a starting and/or stopping point for the use of each pattern ink cell.

In an embodiment, the variable data received in conjunction with the print job may include a text string associated with the variable portion of one or more pattern ink cells for rendering one or more objects within the print job. In still another embodiment, the pattern ink cell for one or more objects within the print job may include specialty imaging that provides fraud protection for printed materials resulting from the print job. In this embodiment, the specialty imaging may include at least one of a gloss image, a microtext string, a fluorescent image, an infrared image, and a correlation image.

The method may further include generating and/or retrieving 303 one or more device-independent pattern ink cells for rendering one or more objects within the print job. In an embodiment, a device independent pattern ink cell corresponding to an object in the print job may have been previously created and stored in memory device. The system may retrieve the previously store device independent pattern ink cell. Alternatively and/or additionally, the system may define one or more pattern ink cells as described below.

Figure 4:
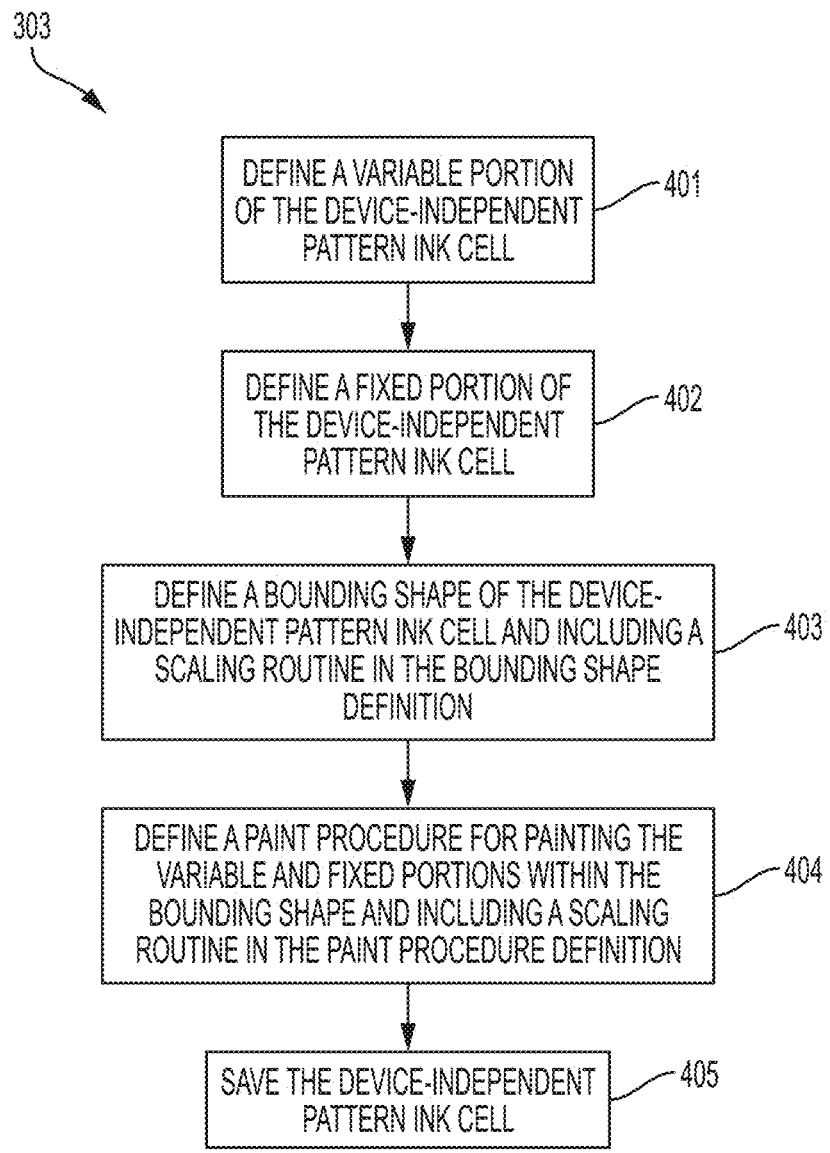
FIG. 4 depicts an example flowchart that illustrates the method for generating a device-dependent pattern ink cell.

FIG. 4 illustrates a process for generating a device-independent pattern ink cell for rendering an object. The method may include defining (step 401) a variable portion of the pattern ink cell is defined in a page description language ("PDL"). The variable portion of the pattern color space may define at least one of a variable gloss image, a variable microtext string, a variable fluorescent image, a variable infrared image, a variable GlossMark™ image, and a variable correlation image, or any variable security element now or hereafter known to those skilled in the art through variable data systems.

In an embodiment, defining the variable portion of the pattern ink cell may include receiving the variable data to be used in a device-independent pattern ink cell. he variable portion of the pattern color space may be based at least in part on variable data associated with the print job. For example, the system may receive a text string to be used in a device-independent pattern ink cell for creating specialty imaging effects such as a gloss image, a microtext string, or a correlation image. It will be understood that 'text' in this context refers to any symbol or sequence of symbols that can be found in typefaces or fonts, including alphanumeric characters, icons, symbols and the like. In an embodiment, a user can define a "tile" of text string for forming the pattern ink cell. Alternatively, the system may automatically define a text string for forming the pattern ink cell based on one or more rules. For example, the text string may be defined based on one or more characteristics of the object that identifies the pattern ink cell to be created for a color or ink parameter (such as object name, object location, object function, etc.), based on one or more characteristics of the print job (such as origin, security feature, etc.), or the like. For example, a text string "CART" may be used to create a pattern ink cell for a color or ink parameter identified by a cart object in the print job. Alternatively and/or additionally, the system may receive one or more UV and IR embedded fields to be rendered in a metameric process. As discussed above, the one or more UV and IR embedded fields may be defined by a user, based on one or more characteristics of the object that identifies the pattern ink cell to be created for a color or ink parameter (such as object name, object location, object function, etc.), based on one or more characteristics of the print job (such as origin, security feature, etc.), or the like.

In an embodiment, defining the variable portion may also include defining various font parameters associated with a text string. An example PostScript pseudo-code for defining a variable portion of a pattern ink cell rendered using a text string "XEROX" and a variable GlossMark™ image is as follows:

/GlossFont/NeueClassic-GL-24 def %600×600 dpi
/GlossFontsize 28.8 def
/GlossFontstring (XEROX!) def A fixed portion of the pattern ink cell is then defined in the PDL at 402 and is based on the variable input. In an embodiment, defining the fixed portion of the pattern ink cell may include specifying a bitmap pattern and associated tiling parameters. It is the geometry of this fixed portion that defines the tiling across the page. In an embodiment, the fixed portion maybe defined using methods similar to those used in Holladay dots.

Next, a bounding shape for the pattern ink cell is defined in the PDL at 403. In an embodiment, may include defining a bounding perimeter based at least in part on size parameters associated with the variable portion defined in 401. In one embodiment, the bounding perimeter may form a rectangle. In other embodiments, the bound perimeter may form any type of geometric or freeform shape. In another embodiment, the bounding perimeter may provide a minimum grout margin around the variable portion. In one embodiment, a pattern ink used for tiling is defined with desired start and end coordinate information for a first text string (xstart, xend), (ystart, yend) included in the command data. An example PostScript pseudo-code for defining a rectangular bounding box is as follows:

/xstart 0 def
    /ystart 0 def
    /xend GlossFontstring stringwidth pop def
    /yend GlossFontsize def
    /BBox [xstart ystart xend yend]
    /XStep xend
    /YStep yend For creating a device-independent pattern ink cell, a scaling routine that includes one or more dynamic runtime commands is included in the above pseudo-code that defines the bounding box. The scaling routine queries the system for current printer resolution every time the pattern ink cell is printed and/or when a print file is created, and adjust the XStep and the YStep accordingly. The XStep is the horizontal displacement between pattern ink cells, specified in pattern space. For no additional horizontal space between cells (so that each pattern ink cell abuts the previous pattern ink cell in the horizontal direction), the width of the text string is used as the XStep, as shown above. The YStep is the vertical displacement between pattern ink cells, specified in pattern space. For no additional vertical space between pattern ink cells (so that each pattern ink cell abuts the previous pattern ink cell in the vertical direction), the height (or the font size) of the text string is used as YStep, as shown above.

In an embodiment, the XStep and the YStep in a device-independent pattern ink are defined for a reference printer resolution and adjusted if the queried printer resolution is different from the reference printer resolution. In an example embodiment, if the XStep and YStep are defined as "x" and "y" for a reference printer resolution of A1 horizontal dpi and B1 vertical dpi, the scaling routine adjusts the XStep and YStep for a printer resolution A2 horizontal dpi and B2 vertical dpi, as per the following:

$XStep\ (adjusted)=(x*A1)/A2$ $YStep\ (adjusted)=(y*B1)/B2$

The scaling routine also applies a similar adjustment to the xend and yend values:

$xend\ (adjusted)=(xend*A1)/A2$ $yend\ (adjusted)=(yend*B1)/B2$

As discussed above, principles of the current disclosure may also be applied to a fixed pattern ink cell pair to create a device-independent fixed pattern ink cell pair. For example, a scaling routine may be included in the following pseudocode for defining a pair of fixed pattern ink cells for applying the above adjustment to the XStep and YStep, and xend and yend values:

/xpix 0.12 def % 600×600 dpi fixed pattern ink cell example
    /ypix 0.12 def
    /xstart 0 def
    /ystart 0 def
    /xend 16 xpix mul def
    /yend 16 ypix mul def
    /BBox [xstart ystart xend yend]
    /XStep xend
    /YStep yend % end example Specifically, adjusting the XStep and YStep, and xend and yend based on the printer resolution adjusts the size of the pattern ink in both X and Y direction according to scale.

Referring back to FIG. 4, a procedure for painting the variable and fixed portions within the bounding shape is defined in the PDL at 404. In other words, the paint procedure is called to write the pattern ink in a selected object during printing. The process may include defining a first reference point within the bounding shape defined in 403 in relation to painting the variable portion of the pattern ink cell, and defining a second reference point within the bounding shape in relation to tiling and painting the fixed portion of the pattern ink cell. An example PostScript pseudo-code for defining a paint procedure is as follows:

/PaintProc
    {xstart ystart moveto GlossFontstring show
    }
    %% this creates the variable data string defined through GlossFontstring
    matrix makepattern
    /GlossTextPaint exch def
    %% identifying the patterns as GlossTextPaint
    grestore In an embodiment, for creating a device-independent pattern ink cell, a scaling routine is also included in the pseudo-code that defines the paint procedure. The scaling routine queries the system for current printer resolution every time the pattern ink cell is printed, and adjusts the xstart and ystart values accordingly. The xstart and ystart value are variable start position coordinates for generating the pattern ink cell at an arbitrary position on an associated media substrate. In an embodiment, the xstart and the ystart in a device-independent pattern ink are defined for a reference printer resolution and adjusted if the queried printer resolution is different from the reference printer resolution. In an example embodiment, if the xstart and ystart are defined as "xstart" and "ystart" for a reference printer resolution of A1 horizontal dpi and B1 vertical dpi, the scaling routine adjusts the xstart and ystart for a printer resolution A2 horizontal dpi and B2 vertical dpi, as per the following:

$xstart\ (adjusted)=(xstart*A1)/A2$ $ystart\ (adjusted)=(ystart*B1)/B2$

According to the above defined adjustment, if xstart and ystart are 0 then xstart, ystart, xend, and yend are all on required pixel boundaries, and no adjustment is needed based on device resolution. However, if for example, at 600 dpi xstart is 0.24 points (i.e., 2 pixels), at 400 dpi xstart (adjusted)=(xstart*600)/400. Furthermore, xend at 600 dpi will be defined as (GlossFontstring stringwidth pop+xstart), and will be adjusted according to the above described example at 400 dpi.

Figure 5:
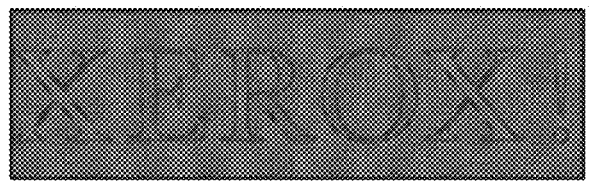
FIG. 5 illustrates an example pattern in cell defined using the methods described in this document.

Using the above pseudo-code, the system renders the above GlossMark™ font ("XEROX") within a selectively bounded area by identifying an outline of the bounded area, computing the bounding box, and computing a matching text string for the bounding box based on a printer resolution. The system uses the identified bounding box and text string information to render the pattern ink cell to a print media substrate at an arbitrary location (defined by xstart, ystart, xend, and yend) in accordance with the paint procedure. An example, FIG. 5 shows an example pattern ink cell created by the PostSript pseudo-code listed above. The string "XEROX!" can be traced as the texture change of the halftone for this pattern ink cell. In this example, the pattern ink cell of FIG. 5 is available as a "color" or "ink" selection for subsequent PostScript drawing commands. For example, the pattern ink cell can be selected as a color for a color parameter for an object (e.g., lines, text, geometric shapes, freeform shapes, etc.) or an object characteristic (e.g., line color, fill color, foreground color, background color, etc.) in a print document.

Referring back to FIG. 4, the device-independent pattern ink cell created above is at least temporarily saved to a memory at 405. This pattern ink cell can be previously designed with static characteristics that is saved for use during subsequent processing of print jobs. Variable data may be provided in advance of a print job if it is desirable to pre-process the re-useable pattern color space prior to processing the print job. Alternatively, the pattern ink cell may be dynamically designed in conjunction with the processing of a corresponding print job. Both previously and dynamically-designed pattern ink cells can also incorporate variable data associated with the print job.

In an embodiment, the variable portion of the pattern ink cell may be based at least in part on variable data associated with the print job. At least one object within the print job may identify the pattern ink cell for a color parameter. In one embodiment, PostScript may be used as the PDL. In other embodiments, any other PDL (e.g., intelligent printer data stream (IPDS), personal printer data stream (PPDS), portable document format (PDF), printer command language (PCL), extensible markup language (XML), etc.) may be used. he variable portion of the pattern color space may define at least one of a variable gloss image, a variable microtext string, a variable fluorescent image, a variable infrared image, and a variable correlation image. In additional embodiments, the variable portion of the pattern color space may define any variable security element available now or in the future through variable data systems, such as VIPP.

It should be noted that while the above description defines a pattern ink cell using a text string wherein text is any symbol that is encapsulated as font, pattern ink cells may also be image based.

In an embodiment, the system may transform a previously defined device-dependent pattern ink cell to define a device-independent pattern ink cell by adding scaling routine to the pseudo-code for defining the bounding box and paint procedure of the device-dependent pattern ink cell, as discussed above.

Referring back to FIG. 3, once a pattern ink cell is defined and/or retrieved, the electronic device may identify a print device that will be used to print the print job (step 304). The electronic device may do this based on a default print device that is assigned to the electronic device or the applicable document generation application. Alternatively, the electronic device may receive a print device selection by presenting a user with a menu of available print devices and receiving the user's selection of one of the print devices via a user interface. The system may then query applicable print hardware, such as the print device or a component of a print system so that the print device returns certain parameters. For example, a print system may include a DFE and a marking engine. The system may query the print system's DFE to retrieve the print device's current page (i.e., a position on the page the printer is currently located and ready to print), a scale, or the like. The system may query the print system's marking engine to retrieve the marking engine's resolution (or possible resolutions). The resolution(s) may be that which the print components of the print system are capable of printing, measured in units such as in horizontal×vertical dots per inch (dpi).

The system will then transform the one or more device-independent pattern ink cells defined in step 303 into device-dependent pattern ink cells (step 305) by executing the dynamic runtime commands of the one or more scaling routines included in the pseudo-code for generation of each pattern ink cell. Upon execution, the scaling routine will receive as input the identified printer parameters and the metadata associated with each object and transform the device-independent pattern ink cell to a device-dependent pattern ink cell. For example, as discussed above, the system will define device-dependent pattern ink cells by scaling the bounding box and the paint procedure defined in the device-independent pattern ink cell based on printer resolution. In an embodiment, the location for the current page may also be used in generation of the device-dependent pattern ink cells. If a device has multiple possible resolutions, the possible resolutions also may be encoded in the DFE, or the DFE may communicate with the marking engine to return a current resolution for the page location.

The system will then generate an appropriate raster image print file of the print job (step 306). During generation of the raster image print file, the system may identify one or more objects in the print job that identify a pattern ink cell for a color or ink parameter, and use a corresponding device-dependent pattern ink cell (defined in step 305) to create the corresponding raster image portions. The electronic device may save the print file to a memory and/or transmit the print file to the print device (step 307) so that the print device will use the print file to print the document on a substrate (step 308).

Steps 304-306, may be performed every time a print job including variable data to be used in conjunction with the print job is received by the system. Alternatively and/or additionally, steps 304-306 may be performed every time a pattern ink cell is used as a color or ink parameter for an object in a print job.

Figure 6:
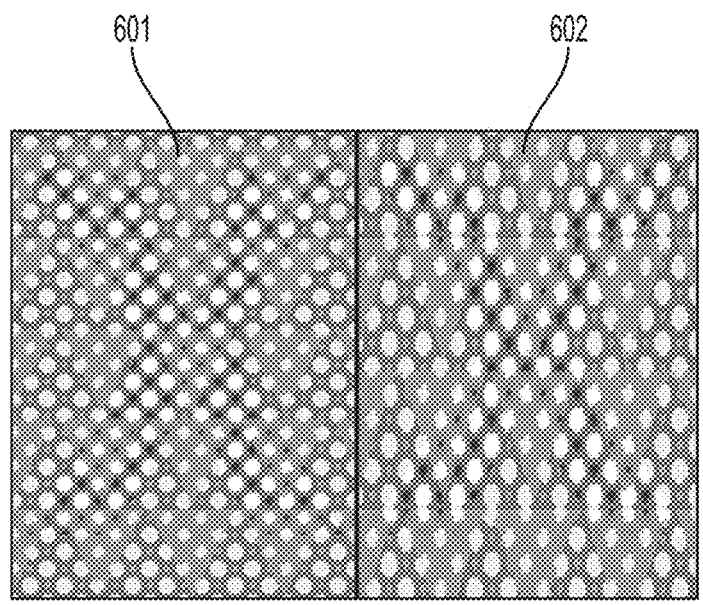
FIG. 6 illustrates an application of the current systems to print an object that identifies a pattern ink cell as a color parameter using different hardware resolutions.

FIG. 6 illustrates an example object "X" printed by rendering a pattern ink cell, as discussed above with respect to FIG. 3. In example 600, the 600×600 dpi object (601) has been printed on a 600×390 dpi device (602) by rendering a device-dependent pattern ink cell that is defined by transforming a device-independent pattern ink cell in accordance with the principles of this disclosure. As shown in FIG. 6, the pattern ink cells are scaled proportionality to the printer resolution, but the "X" remains the same size with the two hardware resolutions.

Figure 1:
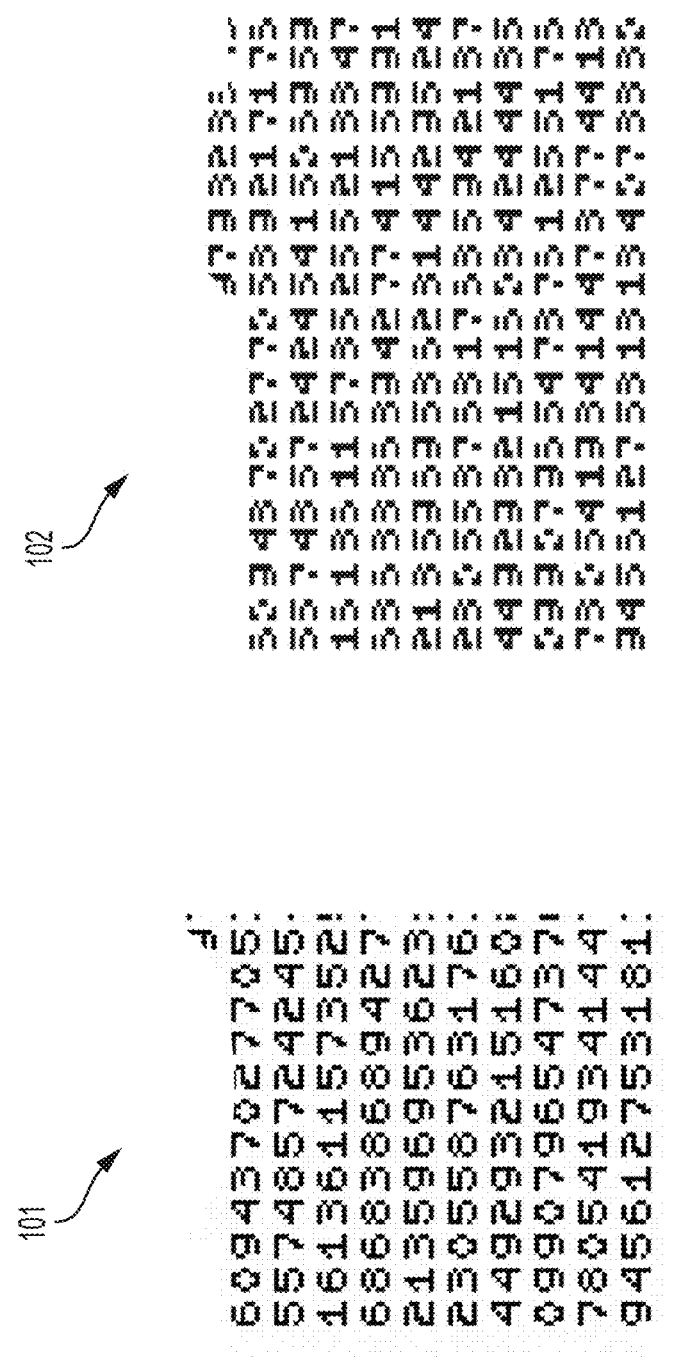
Figure 7:
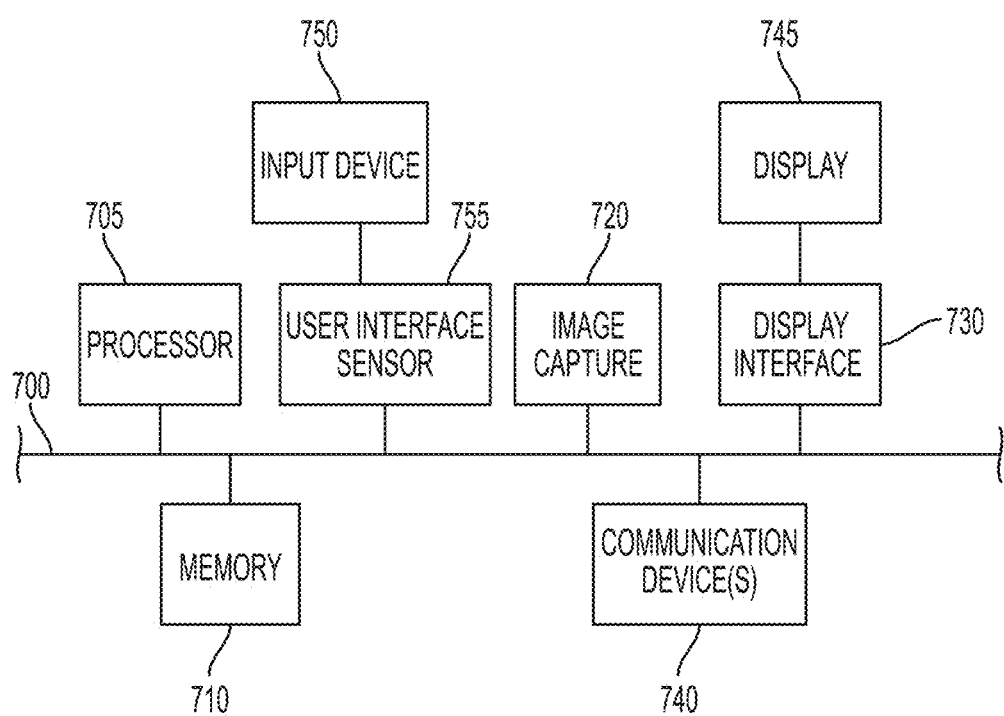
FIG. 7 depicts various embodiments of one or more electronic device for implementing the various methods and processes described herein.

FIG. 7 depicts an example of internal hardware that may be included in any of the electronic components of the system, such as the electronic device, a remote server (such as a server that contains the memory 105 of FIG. 1), or even the print device. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors. Read only memory (ROM), random access memory (RAM), flash memory, hard drives and other devices capable of storing electronic data constitute examples of memory devices 710. A memory device may include a single device or a collection of devices across which data and/or instructions are stored.

An optional display interface 730 may permit information from the bus 700 to be displayed on a display device 745 in visual, graphic or alphanumeric format. An audio interface and audio output (such as a speaker) also may be provided. Communication with external devices may occur using various communication devices 740 such as a transmitter, transceiver, antenna, communications port or a similar device. A communication device 740 may be attached to a communications network, such as the Internet, a local area network or a cellular telephone data network.

The hardware may also include a user interface sensor 755 that allows for receipt of data from input devices 750 such as a keyboard, a mouse, a joystick, a touchscreen, a remote control, a pointing device, a video input device and/or an audio input device. Data also may be received from an image capturing device 720, such of that a scanner or camera.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of printing a document using a device-independent pattern ink cell, the method comprising, by a processor:
receiving a print job for printing a document that includes one or more security elements;
identifying an object corresponding to a security element in the print job that identifies a pattern ink cell for a color parameter;
defining a device-independent pattern ink cell for rendering the identified object, wherein the definition of the device-independent pattern ink cell comprises at least one scaling routine for adjusting a parameter of the device-independent pattern ink cell based on a resolution of a print device that will be used for printing the document;
querying a print system to return a device resolution and a current page location for a print device of the print system that will be used for printing the document;
receiving, from the print system, the device resolution and the current page location;
executing the at least one scaling routine to transform the device-independent pattern ink cell to yield a device-dependent pattern ink cell;
generating a print file for the document using the device-dependent pattern ink cell so that the print file will, when received by the print system, cause the print device of the print system to print the document with the one or more security elements at a scale corresponding to the device resolution and the current page location; and
transmitting the print file to the print device of the print system.

2. The method of claim 1, further comprising, by the print device:
receiving the print file; and
using the print file to print the document on a substrate.

3. The method of claim 1, wherein generating the print file for the document using the device-dependent pattern ink cell comprises generating a raster image print file for the identified object using the device-dependent pattern ink cell.

4. The method of claim 1, wherein querying the print system to return the device resolution and the current page location comprises:
querying a digital front end of the print system to return the current page location; and
querying a print engine of the print system to return the device resolution.

5. The method of claim 1, wherein the identified object includes one or more of the following:
a straight line segment that identifies a pattern ink cell for line color;
a freeform line segment that identifies the pattern ink cell for line color;
a geometrical shape that identifies the pattern ink cell for fill color; or
a freeform geometrical shape that identifies the pattern ink cell for fill color.

6. The method of claim 1, wherein defining the device-independent pattern ink cell for rendering the identified object comprises:
defining, in a page description language, a bounding shape for the device-independent pattern ink that comprises a first scaling routine, wherein the first scaling routine adjusts a parameter of the bounding shape based on a resolution of the print device used for printing the document; and
defining, in the page description language, a procedure for painting a variable portion and a fixed portion of the device-independent pattern ink cell within the bounding shape that comprises a second scaling routine, wherein the second scaling routine adjusts a parameter of the paint procedure based on the resolution of the print device.

7. The method of claim 6, further comprising:
defining the variable portion of the device-independent pattern ink in the page description language; and
defining the fixed portion of the device-independent pattern ink in the page description language.

8. The method of claim 1, wherein executing the at least one scaling routine to transform the device-independent pattern ink cell to yield the device-dependent pattern ink cell comprises adjusting the parameter of the device-independent pattern ink cell based on the device resolution and the current page location.

9. The method of claim 1, further comprising saving the defined device-independent pattern ink cell to a memory.

10. The method of claim 1, wherein defining the device-independent pattern ink cell for rendering the identified object comprises:
receiving a previously stored device-dependent pattern ink cell; and
transforming the previously stored device-dependent pattern ink cell to the device independent pattern-ink cell by adding a scaling routine to the definition of the previously stored device-dependent pattern ink cell.

11. A document printing system for printing a document using a device-independent pattern ink cell, the system comprising:
a processing device; and
a non-transitory, computer-readable memory containing programming instructions that are configured to cause the processing device to:
receive a print job for printing a document that includes one or more security elements;
identify an object corresponding to a security element in the print job that identifies a pattern ink cell for a color parameter;
define a device-independent pattern ink cell for rendering the identified object, wherein the definition of the device-independent pattern ink cell comprises at least one scaling routine for adjusting a parameter of the device-independent pattern ink cell based on a resolution of a print device that will be used for printing the document;
query a print system to return a device resolution and a current page location for a print device of the print system that will be used for printing the document;
receive, from the print system, the device resolution and the current page location;
execute the at least one scaling routine to transform the device-independent pattern ink cell to yield a device-dependent pattern ink cell;
generate a print file for the document using the device-dependent pattern ink cell so that the print file will, when received by the print system, cause the print device of the print system to print the document with the one or more security elements at a scale corresponding to the device resolution and the current page location; and
transmit the print file to the print device of the print system.

12. The system of claim 11, further comprising:
the print device; and
additional programming instructions that are configured to cause the print device to:
receive the print file, and
use the print file to print the document on a substrate.

13. The system of claim 11, wherein the instructions to generate the print file for the document using the device-dependent pattern ink cell comprise instructions to generate a raster image print file for the identified object using the device-dependent pattern ink cell.

14. The system of claim 11, wherein the instructions to query the print system to return the device resolution and the current page location comprise instructions to:
query a digital front end of the print system to return the current page location; and
query a print engine of the print system to return the device resolution.

15. The system of claim 11, wherein the identified object includes one or more of the following:
a straight line segment that identifies a pattern ink cell for line color;
a freeform line segment that identifies the pattern ink cell for line color;
a geometrical shape that identifies the pattern ink cell for fill color; or
a freeform geometrical shape that identifies the pattern ink cell for fill color.

16. The system of claim 11, wherein the instructions to define the device-independent pattern ink cell for rendering the identified object comprise instructions to:
define, in a page description language, a bounding shape for the device-independent pattern ink that comprises a first scaling routine, wherein the first scaling routine adjusts a parameter of the bounding shape based on a resolution of the print device used for printing the document; and
define, in the page description language, a procedure for painting a variable portion and a fixed portion of the device-independent pattern ink cell within the bounding shape that comprises a second scaling routine, wherein the second scaling routine adjusts a parameter of the paint procedure based on the resolution of the print device.

17. The system of claim 16, further comprising additional programming instructions configured to cause the processor to:
define the variable portion of the device-independent pattern ink in the page description language; and
define the fixed portion of the device-independent pattern ink in the page description language.

18. The system of claim 11, wherein the instructions to execute the at least one scaling routine to transform the device-independent pattern ink cell to yield the device-dependent pattern ink cell comprise instructions to adjust the parameter of the device-independent pattern ink cell based on the device resolution and the current page location.

19. The system of claim 11, further comprising additional programming instructions configured to cause the processor to save the defined device-independent pattern ink cell to a memory.

20. The system of claim 11, wherein the instructions to define the device-independent pattern ink cell for rendering the identified object comprise instructions to:
receive a previously stored device-dependent pattern ink cell; and
transform the previously stored device-dependent pattern ink cell to the device independent pattern-ink cell by adding a scaling routine to the definition of the previously stored device-dependent pattern ink cell.

\* \* \* \* \*